US009828215B2

(12) United States Patent
Pelto-Huikko

(10) Patent No.: US 9,828,215 B2
(45) Date of Patent: Nov. 28, 2017

(54) ROPE FOR A HOISTING DEVICE AND ELEVATOR

(71) Applicant: KONE Corporation, Helsinki (FI)

(72) Inventor: Raimo Pelto-Huikko, Vantaa (FI)

(73) Assignee: KONE CORPORATION, Helsinki (FI)

(*) Notice: Subject to any disclaimer, the term of this patent is extended or adjusted under 35 U.S.C. 154(b) by 0 days.

(21) Appl. No.: 14/482,687

(22) Filed: Sep. 10, 2014

(65) Prior Publication Data

US 2015/0101888 A1 Apr. 16, 2015

(30) Foreign Application Priority Data

Oct. 10, 2013 (EP) .................................... 13188105

(51) Int. Cl.

| | |
|---|---|
| ***B66B 7/06*** | (2006.01) |
| ***D07B 1/22*** | (2006.01) |
| ***D07B 1/16*** | (2006.01) |
| ***F16G 1/08*** | (2006.01) |
| ***F16G 9/04*** | (2006.01) |
| *B66B 11/08* | (2006.01) |
| *B66B 11/00* | (2006.01) |

(52) U.S. Cl.

CPC ............ *B66B 7/062* (2013.01); *B66B 11/008* (2013.01); *D07B 1/22* (2013.01); *D07B 2205/3003* (2013.01); *D07B 2205/3007* (2013.01); *D07B 2501/2007* (2013.01); *Y10T 428/2457* (2015.01); *Y10T 428/249945* (2015.04)

(58) Field of Classification Search

CPC ..... B55B 7/062; B55B 11/008; B55B 11/009; D07B 2501/2007; F16G 1/08; F16G 1/12; F16G 1/16

See application file for complete search history.

(56) References Cited

U.S. PATENT DOCUMENTS

| | | | | |
|---|---|---|---|---|
| 2,519,590 A * | 8/1950 | Mitchell | ................ B29D 29/10 474/261 |
| 2,526,324 A * | 10/1950 | Bloomfield | ............... F16G 1/16 156/175 |
| 3,980,174 A * | 9/1976 | Conrad | .................. B65G 15/46 198/835 |
| 5,127,783 A * | 7/1992 | Moghe | .................. B29C 70/222 156/172 |
| 6,364,061 B2 * | 4/2002 | Baranda | .................... B66B 7/06 187/251 |
| 6,508,051 B1 * | 1/2003 | De Angelis | ..................... 57/223 |

(Continued)

FOREIGN PATENT DOCUMENTS

| | | | | |
|---|---|---|---|---|
| CH | WO 2011128223 A2 * | 10/2011 | ............. | B66B 7/062 |
| DE | EP 1396458 A2 * | 3/2004 | ............. | B66B 7/062 |

(Continued)

*Primary Examiner* — Michael Mansen
*Assistant Examiner* — Stefan Kruer
(74) *Attorney, Agent, or Firm* — Birch, Stewart, Kolasch & Birch, LLP

(57) ABSTRACT

A rope for a hoisting device, which rope is belt-shaped and includes several load bearing members spaced apart in the width direction of the belt-shaped rope and embedded in a common coating, each of the load bearing members including several load bearing strings twisted together. The load bearing strings are made of composite material including reinforcing fibers embedded in polymer matrix.

17 Claims, 5 Drawing Sheets

(56) References Cited

U.S. PATENT DOCUMENTS

| | | | | |
|---|---|---|---|---|
| 6,742,769 | B2 * | 6/2004 | Baranda et al. | 254/390 |
| 7,757,472 | B2 * | 7/2010 | Dold et al. | 57/236 |
| 2003/0121729 | A1 * | 7/2003 | Heinz et al. | 187/254 |
| 2004/0110441 | A1 * | 6/2004 | Parrini | D07B 1/02 442/181 |
| 2004/0231312 | A1 * | 11/2004 | Honda | B66B 7/06 57/241 |
| 2007/0137163 | A1 * | 6/2007 | Hess | D07B 1/02 57/210 |
| 2008/0051240 | A1 * | 2/2008 | Goser | 474/205 |
| 2008/0081721 | A1 * | 4/2008 | Bissig et al. | 474/260 |
| 2008/0250631 | A1 * | 10/2008 | Buckley | B21F 7/00 29/820 |
| 2009/0166132 | A1 * | 7/2009 | Ach | B66B 7/062 187/254 |
| 2010/0243378 | A1 * | 9/2010 | Begle | B66B 7/062 187/254 |
| 2011/0000746 | A1 * | 1/2011 | Pelto-Huikko | B66B 7/062 187/254 |
| 2011/0192683 | A1 * | 8/2011 | Weinberger | D07B 1/145 187/254 |
| 2013/0037353 | A1 | 2/2013 | Phillips et al. | |
| 2013/0048432 | A1 * | 2/2013 | Alasentie | B66B 7/064 187/251 |
| 2013/0206516 | A1 * | 8/2013 | Pelto-Huikko | B66B 7/062 187/254 |

FOREIGN PATENT DOCUMENTS

| | | | | |
|---|---|---|---|---|
| DE | 102008037541 | A1 * | 10/2009 | B66B 7/06 |
| DE | 102010042357 | A1 | 4/2012 | |
| ES | EP 2020398 | A1 * | 2/2009 | B66B 7/06 |
| JP | 09021084 | A * | 1/1997 | D07B 1/16 |
| WO | WO 2008/129116 | A1 | 10/2008 | |
| WO | WO 2009/090299 | A1 | 7/2009 | |
| WO | WO 2013/053621 | A1 | 4/2013 | |

* cited by examiner

ROPE FOR A HOISTING DEVICE AND ELEVATOR

FIELD OF THE INVENTION

The invention relates to a rope of a hoisting device, in particular to a rope of an elevator meant for transporting passengers and/or goods.

BACKGROUND OF THE INVENTION

An elevator typically comprises a hoisting roping suspending a vertically movable elevator car. The elevator further comprises a drive machine which drives the elevator car under control of an elevator control system. The driving force is typically transmitted from the drive machine to the car via said hoisting roping. The drive machine typically comprises a motor and a drive wheel engaging the individual ropes of the hoisting roping each of the ropes passing around the drive wheel and being connected to the car. The material and overall structure of the rope affects several properties of the rope, which are important for the elevator. In particular, the minimal bending radius of the rope, the weight of the rope, the force transmission ability of the rope as such, as well as the force transmission ability via the engagement between the rope and the drive wheel are all affected by the material and overall structure of the rope. These properties affect the properties of the complete elevator. In particular, the minimal bending radius of the rope is important as it sets a lower limit for the radius of the wheels around which the rope passes in the elevator.

A large bending radius may reduce the space efficiency of the elevator as well as make the layout of the elevator more complicated. The drive wheel may also be necessary to be designed with a radius larger than optimal in terms of torque production and rotational speed. Heavy weight of each rope and the overall weight of the roping reduces energy efficiency of the elevator. The force transmission ability of each rope should therefore be as great as possible relative to the weight of the rope. These properties have been optimized in the rope as disclosed in international patent application WO2009090299 A1 for instance. In this particular case, a wide surface is provided for the rope which facilitates firm engagement with a drive wheel. The surface material is elastomeric, which provides protection for the rope inner parts and/or high friction thereby facilitating firm engagement with a drive wheel.

A problem with the solutions according to prior art is that it is difficult to form a rope which has a high load bearing ability (in particular tensile strength) relative to weight of the rope while at the same time making the rope bendable with a reasonably small bending radius and yet having a surface enabling good protection for the inner parts and/or good force transmitting abilities via the surface.

BRIEF DESCRIPTION OF THE INVENTION

The object of the invention is, inter alia, to solve previously described drawbacks of known solutions and problems discussed later in the description of the invention. The object of the invention is to introduce a new rope as well as an elevator having a new rope, which rope is such that it has a high load bearing ability relative to weight of the rope while at the same time bendable with a reasonably small bending radius and yet having a surface enabling protection for the inner parts and/or good force transmitting abilities via the surface. Embodiments are presented, inter alia, where a high load bearing ability relative to weight is facilitated such that the rope has a large total cross-sectional area of the load bearing members relative to the total cross-sectional area of the parts of the rope not bearing load thereby minimizing the additional weight caused to the rope by the non-bearing parts of the rope.

It is brought forward a new rope for a hoisting device, in particular for an elevator, which rope is belt-shaped and comprises several parallel load bearing members spaced apart in the width direction of the belt-shaped rope and embedded in a common coating. Each of the load bearing members comprises several load bearing strings twisted together, which load bearing strings are each made of composite material comprising reinforcing fibers embedded in polymer matrix. Thus, one or more of the objects of the invention are achieved. In particular, thus a rope can be obtained which has a high load bearing ability (in particular tensile strength provided largely by the reinforcing fibers) relative to weight of the rope while at the same time making the rope bendable with a reasonably small bending radius and yet having a surface enabling good protection for the inner parts and/or good force transmitting abilities via the surface. The coating also enables combining the load-bearing strings to form a cross-section which can facilitate using only small amounts of coating material.

In a preferred embodiment one or more, preferably each, of said load bearing members has at least one at least substantially flat outer side face covered by said coating with at least substantially constant material thickness. The portion of the coating positioned against the flat outer side face of the load bearing members thereby has a flat outer side face extending parallelly with the flat outer side face of the load bearing member, which flat outer side face forms a portion of the outer surface of the rope in question. By coating a flat face, the thickness of the coating can be kept small in amount simply for the whole area of the coated face. The amount of material of the coating can in this way be easily be minimized, which is advantageous both for the sake of reducing unnecessary material use but importantly for reducing the total weight of the rope. In fact, it is preferable that at least some of the load bearing members of the rope comprises at several at least substantially flat outer side faces covered by said coating with at least substantially constant material thickness. Thereby, the thickness of the coating is minimized on more than one side of said at least some load bearing members, whereby said advantage is increased.

In a preferred embodiment, one or more, preferably each, of said load bearing members of the rope has at least one at least substantially flat outer side face extending in width direction of the belt-shaped rope. Thus, the cross-sectional area of the rope can be efficiently utilized for load bearing function while keeping the thickness of the rope small. Also, the thickness of the coating positioned against the flat outer side face can thus be small in amount and thereby the amount of material of the coating can in this way be easily be minimized, which is advantageous both for the sake of reducing unnecessary material use but importantly for reducing the total weight of the rope.

In a preferred embodiment, one or more, preferably each, of said load bearing members has plurality of at least substantially flat outer side faces. This is advantageous for the purpose of more efficient usage of the cross section of the rope. In particular, the material thickness of the common coating can in this way be formed thin in several points. Thereby, the weight addition caused on the rope by the coating can be minimized. This can be obtained with an embodiment where each of said load bearing members has rectangular or triangular or pentagonal or hexagonal cross-sectional shape.

In a preferred embodiment, one or more, preferably each, of said load bearing members has four at least substantially flat outer side faces. This is advantageous for the purpose of more efficient usage of the cross section of the rope. In particular, the material thickness of the common coating can in this way be formed thin in several points. Thereby, the weight addition caused on the rope by the coating can be minimized.

In a preferred embodiment, one or more, preferably each, of said load bearing members is at least substantially rectangular in cross section. The load bearing parts of this shape are easy to place close to each other and/or the surface of the rope (i.e. coated with small material thickness), when compared with load bearing parts of round cross section for instance. This structure is advantageous as the cross-sectional area of the rope can be efficiently utilized for load bearing function. Also, the amount of material of the coating can in this way be minimized, which is advantageous both for the sake of reducing unnecessary material use but importantly for reducing the total weight of the rope. In a further refined embodiment each of said load bearing members is at least substantially quadratic in cross section. In this way the load bearing strings can easily be shaped to have closely same size and shape in cross section with each other.

In a preferred embodiment, one or more, preferably each, of said load bearing members has rounded corners. Thus, the outer corners of the load bearing members as well as the inner corners of the coating can be protected from wear and fractures.

In a preferred embodiment the rope has a contoured side surface provided with grooves oriented in the longitudinal direction of the rope, including grooves positioned in width direction of the rope centrally between adjacent load bearing members. Thus, the coating is at its thickest at the point of the load bearing member, and thinnest at the point of the gap between adjacent load bearing members. This is advantageous inter alia, because the load bearing members can be protected with minimal thickness of coating, which is important for facilitating a light total weight of the rope.

In a preferred embodiment the rope has a contoured side surface provided with grooves oriented in the longitudinal direction of the rope, including grooves of a first depth positioned in width direction of the rope centrally between adjacent load bearing members and grooves of a second depth positioned in width direction of the rope at the point of a load bearing member, the second depth being smaller than the first depth. Thus, a dense groove pattern can be provided with only thin amount of coating, yet the coating is not excessively thin at the point of the load bearing members thereby still being capable of providing sufficient means for protection and/or force transmission. These functions can be then provided with minimal thickness of coating which is important for facilitating a light total weight of the rope. In use in an elevator arrangement said contoured side is preferably fitted to pass against a contoured circumference of a drive wheel forming a counterpart for said contoured side of the rope, which circumference is provided with ribs, a rib extending into each of said grooves of the rope.

In a preferred embodiment said load bearing strings are twisted around a center string. The center string is preferably also a load bearing composite string. The center string is preferably parallel with the longitudinal direction of the load bearing member as well as with the longitudinal direction of the rope. It has preferably a round cross section.

In a preferred embodiment at least one layer of said load bearing strings surrounds the center string the innermost layer leaning against the center string. The strings of the layer are in helical formation around the center string.

In a preferred embodiment each load bearing string of said layer has a wedge shaped cross section (tapering towards the center of the load bearing member).

In a preferred embodiment each of the load bearing members of the innermost layer has a side face via which it leans against the center string, the face having a concave shape forming a counterpart for a convex shape of the center string.

In a preferred embodiment individual load bearing strings comprise a thin polymer coating around it isolating the string in question from the load bearing strings next to it.

In a preferred embodiment said load bearing members are parallel with the longitudinal direction of the rope. Thereby, the load bearing members are oriented in the direction of the force when the rope is pulled, which gives the rope a high tensile stiffness and strength.

In a preferred embodiment said reinforcing fibers are parallel with the longitudinal direction of the load bearing string. In particular, the reinforcing fibers of the same load bearing string are preferably essentially untwisted in relation to each other. Thereby, the reinforcing fibers are oriented in the direction of the force when the string in question is pulled, which gives the strings a high tensile stiffness and strength.

In a preferred embodiment said reinforcing fibers are carbon fibers. Carbon fibers are both lightweighted and own good tensile properties, in particular tensile strength and stiffness. Thus, they suit well for use to provide the load bearing ability for a rope of a hoisting device.

Preferably, individual reinforcing fibers are homogeneously distributed in said polymer matrix. Preferably, over 50% of the cross-sectional area of the load bearing string consists of said reinforcing fiber.

In a preferred embodiment said common coating is made of elastomeric material, such as silicon or substantially silicon-based material or polyurethane or substantially polyurethane-based material. Elastomeric material, in particular the aforementioned materials, provide protection for the load bearing members. Also, the coating made of such material can efficiently be utilized as a media for transmitting external forces to the load bearing members.

In a preferred embodiment the load bearing members of the rope cover together majority, preferably 70% or over, more preferably 75% or over, most preferably 80% or over, most preferably 85% or over, of the width of the cross-section of the rope. In this way at least majority of the width of the rope will be effectively utilized and the rope can be formed to be light and thin in the bending direction for reducing the bending resistance.

In a preferred embodiment the module of elasticity (E) of the polymer matrix is over 2 GPa, most preferably over 2.5 GPa, yet more preferably in the range 2.5-10 GPa, most preferably of all in the range 2.5-3.5 GPa. In this way a structure is achieved wherein the matrix essentially supports the reinforcing fibers, in particular from buckling. One advantage, among others, is a longer service life. The turning radius in this case is, formed so large that the above defined measures for coping with large turning diameter are especially advantageous.

It is also brought forward a new elevator comprising a vertically movable elevator car and a roping suspending the car, the roping comprising at least one rope. The roping comprises at least one rope, preferably several of them, which are as described above or elsewhere in the application. Thus, an elevator is achieved, which has, thanks to the tensile properties provided by the fibers of the rope a potential for good energy efficiency, as well as high lifting capacity. Thanks to its good bending properties the rope is drivable with a small radius drive wheel. This makes it possible to design the drive wheel to have a high rotational speed if needed and/or provides freedom to choose the drive wheel structure more freely. The roping layout can also more freely be formed simple in terms of its route involving one or more turns around diverting and/or drive wheel(s) of the elevator.

Preferably, the elevator further comprises a drive machine which drives the elevator car under control of an elevator control system, in particular as a response to calls from passengers. Preferably, the drive machine comprises a a drive wheel, which engages the rope(s) of said roping. The rope(s) of the roping pass around the drive wheel in such particular way that the wide side of each rope rests against the circumference of the drive wheel. Thus, driving force can be effectively transmitted from the motor to the car and preferably also to said counterweight via the drive wheel and the roping so as to move the car, and preferably also counterweight if the elevator comprises one. Preferably, the elevator comprises a vertically movable counterweight interconnected with the car and suspended by said roping. Then, the rope(s) of the roping pass around the drive wheel and suspend the elevator car and preferably also a counterweight on opposite sides of the drive wheel.

The elevator as describe anywhere above is preferably, but not necessarily, installed inside a building. The car is preferably arranged to serve two or more landings. The car preferably responds to calls from landing(s) and/or destination commands from inside the car so as to serve persons on the landing(s) and/or inside the elevator car. Preferably, the car has an interior space suitable for receiving a passenger or passengers.

BRIEF DESCRIPTION OF THE DRAWINGS

In the following, the present invention will be described in more detail by way of example and with reference to the attached drawings, in which

FIG. 3b illustrates partly an enlarged view of the cross section illustrated in FIGS. 1a and 3a.

DETAILED DESCRIPTION

Figure 1A:
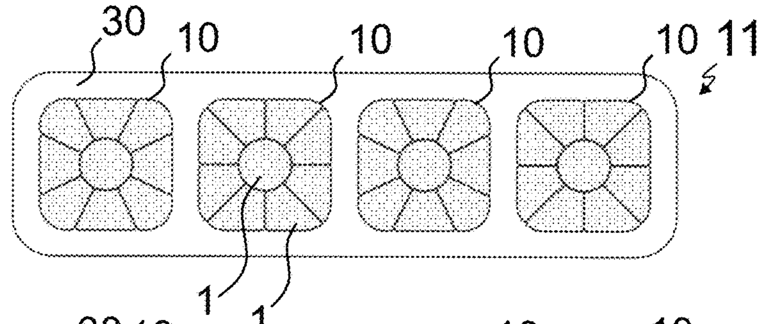
FIGS. 1a to 1l illustrate alternative preferred cross sections of the rope.
Figure 1B:
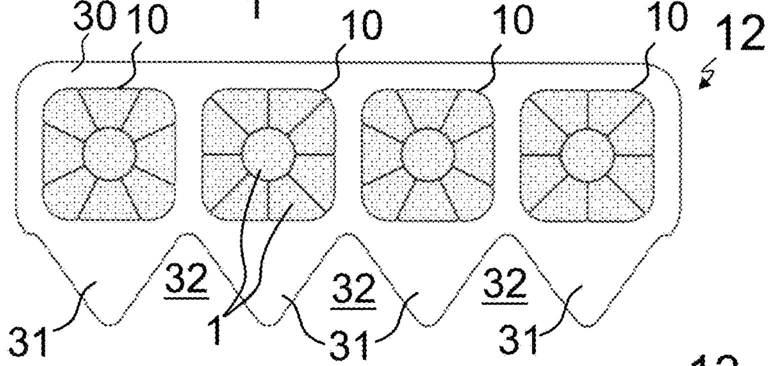
Figure 1C:
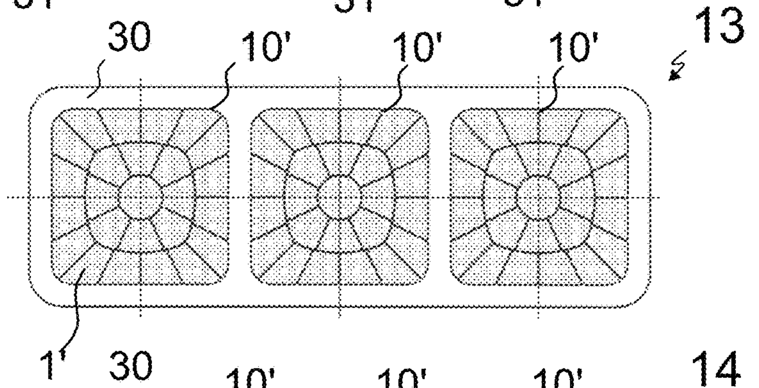
Figure 1D:
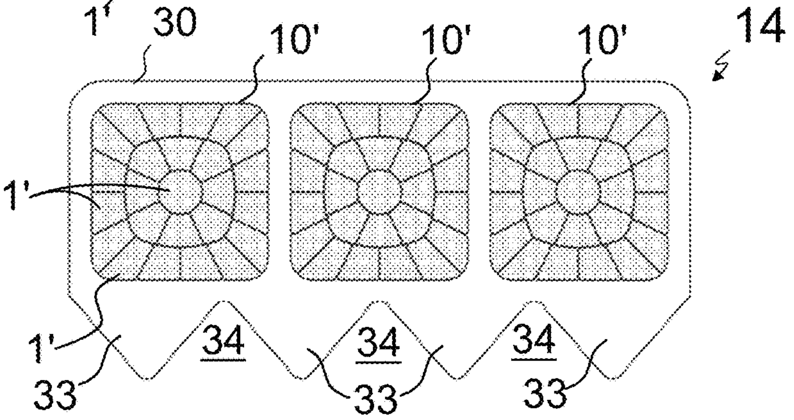
Figure 1E:
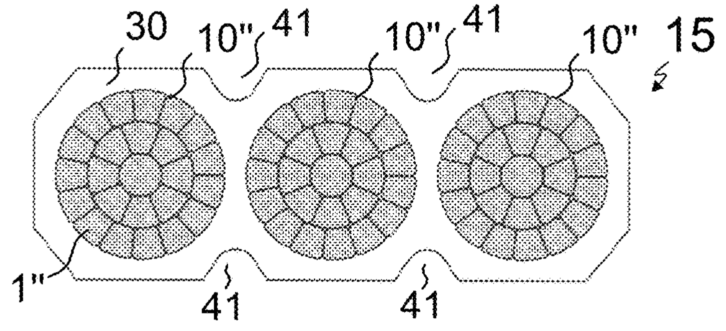
Figure 1F:
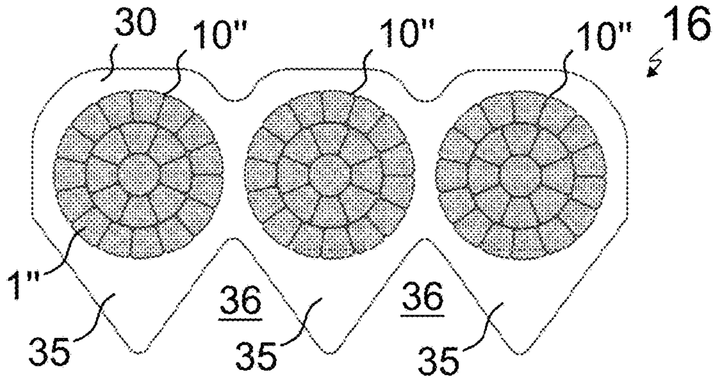
Figure 1G:
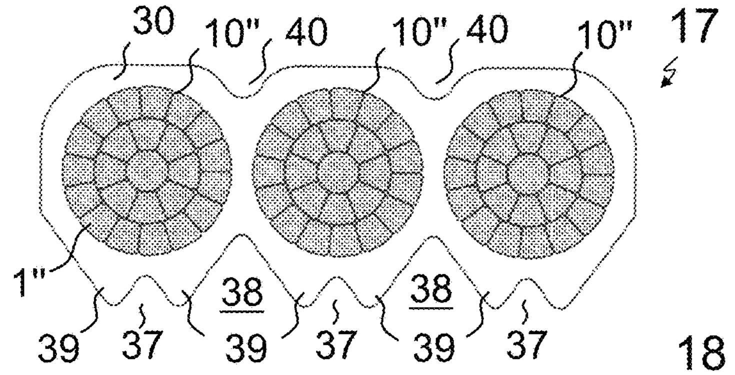
Figure 1H:
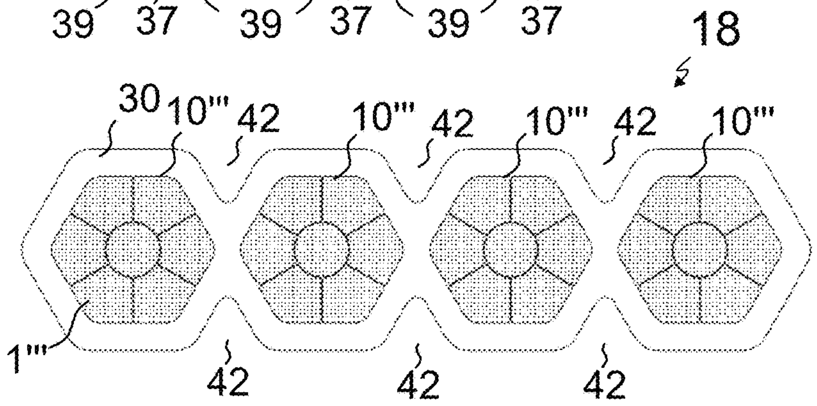
Figure 1I:
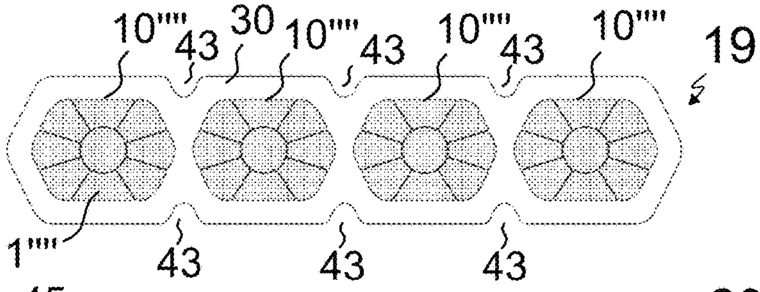
Figure 1J:
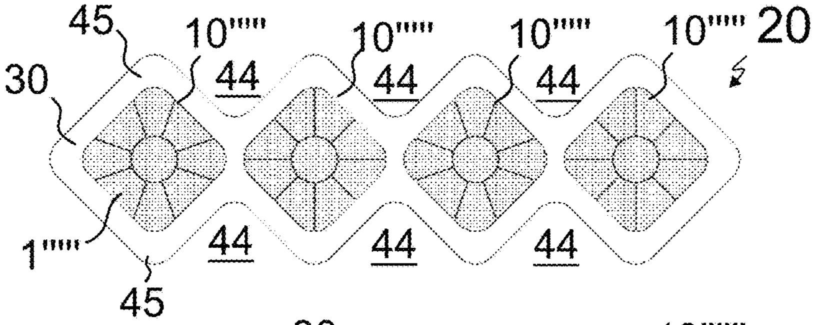
Figure 2:
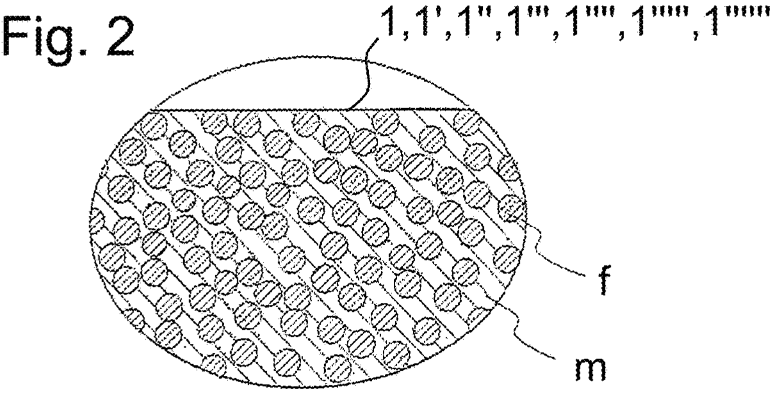
FIG. 2 illustrates a preferred internal structure for the load bearing member.
Figure 3A:
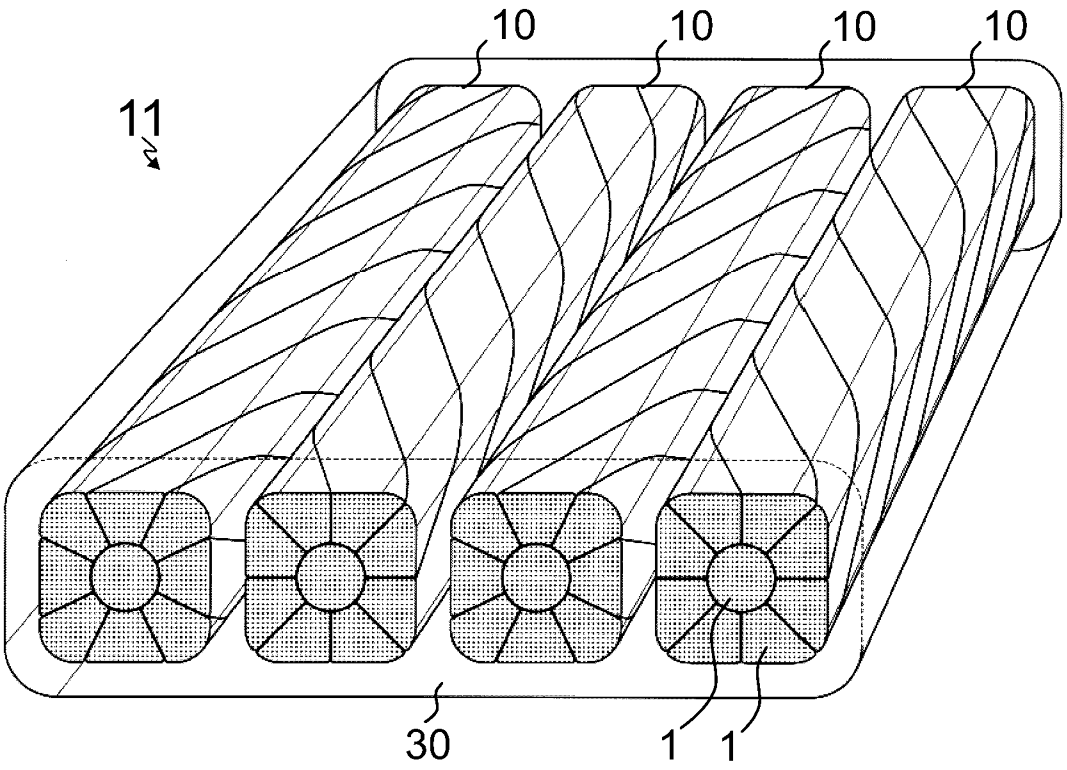
FIG. 3a illustrates the rope of FIG. 1a three-dimensionally.

FIGS. 1a to 1g illustrate each a cross-section of an embodiment of a rope 11,12,13,14,15,16,17,18,19,20,21,22 which rope is belt-shaped and thereby has width larger than thickness as measured in transverse direction of the rope 11,12,13,14,15,16,17,18,19,20,21,22. The rope 11,12,13,14,15,16,17,18,19, 20,21,22 comprises several elongated load bearing members 10,10',10",10''',10'''',10''''',10'''''' spaced apart in the width direction of the belt-shaped rope 11-22 positioned adjacently on a same plane and extending parallel with the longitudinal direction of the rope 11-22. The load bearing members 10,10',10",10''',10'''',10''''',10'''''' are embedded in a coating 30 common for them all, which coating 30 forms the surface of the rope 11-22. The coating 30 binds the load bearing members 10,10',10",10''',10'''',10''''',10'''''' together separating them from each other, which provides the advantage of protection against chafing of individual load bearing members 10,10',10",10''',10'''',10''''',10'''''' against each other, as well as the advantage of accurate positioning of the load bearing members 10,10',10",10''',10'''',10''''',10'''''' relative to each other. Each of the load bearing members 10,10',10",10''',10'''',10''''',10'''''' comprises several load bearing strings 1,1',1",1''',1'''',1''''',1''''''. Each of said load bearing strings 1,1',1",1''',1'''',1''''',1'''''',1''',1'''',1''''',1'''''' is made of composite material comprising reinforcing fibers f embedded in polymer matrix m as illustrated in FIG. 2. The individual fibers f of each of said load bearing string 1,1',1",1''',1'''',1''''',1'''''',1''',1'''',1''''',1'''''' are thereby bound to each other with the polymer matrix m so that these together form a uniform load bearing composite string 1,1',1",1''',1'''',1''''',1'''''',1''',1'''',1''''',1''''''. Thus, each composite string 1,1',1",1''',1'''',1''''',1'''''' is one solid elongated rodlike piece. The load bearing composite strings 1,1',1",1''',1'''',1''''',1'''''',1''',1'''',1''''',1'''''' of each load bearing member 10,10',10",10''',10'''',10''''',10'''''' are twisted together in the manner as illustrated three-dimensionally in FIG. 3a. Said strings 1,1',1",1''',1'''',1''''',1'''''' are thus in helical formation. For the sake of conciseness, only the rope 11 of FIG. 1a is illustrated in this three-dimensional way. The composite strings 1 of each load bearing member 10,10',10",10''',10'''',10''''',10'''''' are each load bearing elements of the load bearing member 10,10',10",10''',10'''',10''''',10''''''.

The belt-shaped form gives the rope 11-22 a wide surface via which traction can be transmitted to the rope 11-22, as well as a thin cross-section which makes the rope 11-22 easily bendable. The bending direction of each rope 11-22 is around an axis that is in the width direction of the rope 11-22 (up or down in the FIGS. 1a to 1l). The fiber-reinforced composite material of the strings 1,1',1",1''',1'''',1''''',1'''''' is light-weighted and has good tension bearing properties. A fiber-reinforced composite material is, however, relatively brittle and thereby difficult to bend sharply without risks of fractures in the composite material. The disadvantages of this material characteristic are minimized by the particular layout of internal structural parts of the rope as illustrated in FIGS. 1a to 1l. The twisted structure facilitates bending properties of the rope 11-22, because the strings 1,1',1",1''', 1'''',1''''',1'''''' can straighten and slightly reorganize during bending. Thereby, the rope 11-22 can be provided with a small bending radius without reducing the thickness of the individual load-bearing parts 10,10',10",10''',10'''',10''''', 10'''''' (as measured in thickness direction of the rope) to a great extent. Forming the load bearing members 10,10',10", 10''',10'''',10''''',10'''''' of twisted composite strings can thereby provide the rope 11-22 a great bearing cross-sectional area. Thereby, the cross-section of the rope 11-22 can be utilized for load bearing function effectively. The proportion that the coating 30 forms of the total weight of the rope can thus be reduced. Thereby, the total weight of the rope 11-22 can be utilized for load bearing function effectively.

Said reinforcing fibers f are most preferably carbon fibers, as they are both lightweighted and own good tensile properties, in particular tensile strength and stiffness. Thus, they suit well for use to provide the load bearing ability for a rope of a hoisting device. However, alternatively other reinforcing fibers can be used instead of carbon fibers. Especially, glass fibers are found to be suitable for elevator use, their advantage being that they are cheap and have good availability although a mediocre tensile stiffness. The reinforcing fibers f are most preferably as far as possible parallel with the longitudinal direction of the string 1,1',1",1'",1"",1""', 1""" and therefore at least essentially untwisted in relation to each other. Thereby, the reinforcing fibers f are oriented in the direction of the force when the string in question is pulled. Thereby, the strings 1,1',1",1'",1"",1""',1""" have good tensile stiffness and strength.

The twisted structure of the load bearing members 10,10', 10",10'",10"",10""', 10""" is in the preferred embodiments such that several load bearing composite strings 1,1',1",1'", 1"",1""',1""" are twisted around a center string, which is parallel with the longitudinal direction of the rope 11-22. The center string is preferably also a load bearing composite strings 1,1',1",1'",1"",1""',1""" made of composite material comprising reinforcing fibers f in polymer matrix m, and has thereby corresponding structure and properties as the composite strings 1,1',1",1'",1"",1""',1""" twisted around it. In the preferred embodiment at least one layer of said load bearing composite strings 1,1',1",1'",1"",1""',1""" surrounds the center string the innermost layer leaning against the center string. The strings 1,1',1",1'",1"",1""',1""" of this layer are in helical formation around the center string. In the embodiment as presented in FIGS. 1*a* and 1*b*, there is one such layer around the center string and in the embodiment as presented in each of FIGS. 1*c* to 1*g*, there are two of such layers around the center string, and innermost layer surrounding the center string and an outermost layer surrounding the innermost layer. Each string 1,1',1",1'",1"",1""',1""" of said layer(s) has a wedge shaped cross section, which makes it possible that the strings are densely positioned within the cross-section of the load bearing member 10,10', 10",10'",10"",10""',10""". The term wedge-shaped means that the wires are on average tapered in terms of the dimensions of their cross-section, in particular towards the centerline of the rope. In these preferred embodiments, the strings of the innermost layer has a side face via which it leans against the center string, the face having a concave shape forming a counterpart for a convex shape of the center string. It is preferable, but not necessary, that individual strings 1,1',1",1'",1"",1""',1""" comprise a thin polymer coating (not shown) around it isolating the string 1,1',1",1'", 1"",1""',1""" in question from the strings 1,1',1",1'",1"",1""', 1""" next to it. This allows better movement of the strings 1,1',1",1'",1"",1""',1""" in relation to each other, because polymer can be selected to have such advantageously small friction properties that the films surrounding adjacent strings 1,1',1",1'",1"",1""',1""" move against each other as the load bearing member 10,10',10",10'",10"",10""',10""" bends. No essential wear caused by abrasion occurs between the composite strings 1,1',1",1'",1"",1""',1""". This lengthens the service life of the rope 11-22. The center string has preferably a round cross section thereby allowing slight and unobstructed movement of the strings 1,1',1",1'",1"",1""', 1""" leaning against it.

The aforementioned common coating 30 is preferably made of elastomeric material, such as polyurethane or substantially polyurethane-based material. Alternatively, it may be made of some other elastomeric material, such as silicon or substantially silicon based-material. Elastomeric material, in particular the aforementioned materials, provide protection for the load bearing members 10,10',10",10'", 10"",10""',10""". Also, the coating 30 made of such material can efficiently be utilized as a media for transmitting external forces to the load bearing members 10,10',10",10'",10"", 10""',10""".

Figure 1K:
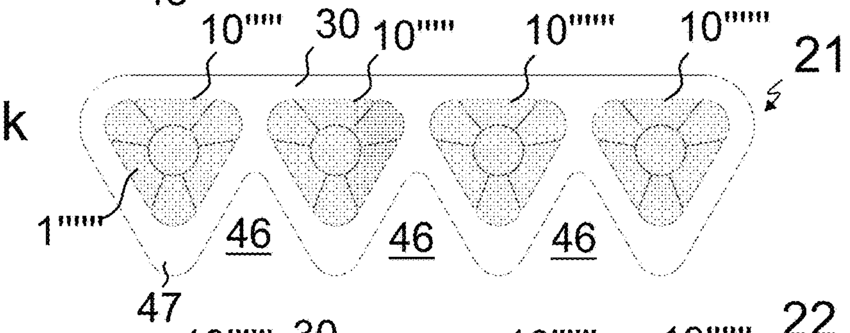
Figure 1L:
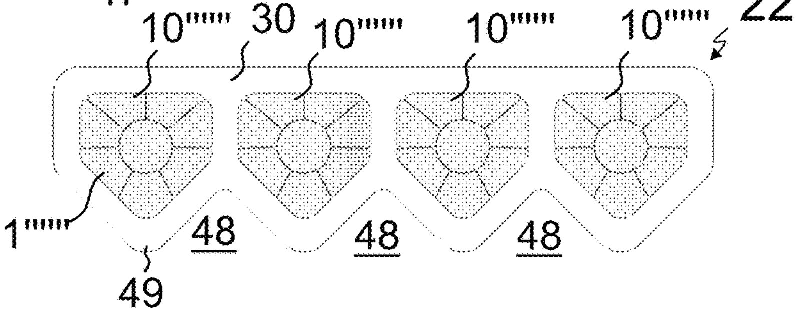

Each of the load bearing members of the rope 11-22 has preferably a rectangular or a round or triangular or pentagonal or hexagonal cross-sectional shape. Embodiments with load bearing members 10, 10' of the round cross-sectional shape are illustrated in FIGS. 1*a* to 1*d*. Embodiments with load bearing members 10" of the rectangular cross-sectional shapes in FIGS. 1*e* to 1*g* and 1*j*. Embodiments with load bearing members 10'",10"" of the hexagonal cross-sectional shapes in FIGS. 1*h* and 1*i*. Embodiment with load bearing members 10""' of the triangular cross-sectional shapes is illustrated in FIG. 1*k*. Embodiment with load bearing members 10""" of the pentagonal cross-sectional shape is illustrated in FIG. 1*l*.

In the preferred embodiments as illustrated in FIGS. 1*a* to 1*d* and 1*h* to 1*l* each of said load bearing members 10,10', 10",10'",10"",10""',10""" comprises at least one flat side face covered by said coating 30 with constant material thickness. The portion of the coating 30 positioned against the flat outer side face of the load bearing members 10,10', 10",10'",10"",10""',10""" thereby has a flat outer side face extending parallelly with the flat outer face of the load bearing member load bearing members 10,10',10",10'",10"", 10""',10""", which outer side face forms a portion of the outer surface of the rope in question. In this way, the thickness of the coating 30 positioned against the flat outer side face can thus be small in amount and thereby the amount of material of the coating 30 can in this way be easily be minimized, which is advantageous both for the sake of reducing unnecessary material use but importantly for reducing the total weight of the rope. In fact, it is preferable that at least some of the load bearing members 10,10',10",10'",10"",10""',10""" of the rope comprises several flat outer side faces covered by said coating 30 with constant material thickness. Thereby, the thickness of the coating 30 is minimized on more than one side of said at least some load bearing members 10,10',10",10'",10"",10""', 10""", whereby said advantage is increased. The flat outer side faces of the load bearing member(s) as well as of the rope(s) is/are visible in the drawings 1*a* to 1*l*, 3*a* and 3*b* where they are drawn as straight edge-lines of the cross-section of the load bearing member/rope.

In the preferred embodiments as illustrated in FIGS. 1*a* to 1*d*, 1*h*, 1*i*, 1*k* and 1*l* each of the load bearing members 10,10',10",10'",10"",10""',10""" of the rope 11-14,18,19,21, 22 has at least one flat outer side face extending in width direction of the belt-shaped rope 11-14,18,19,21,22. Thus, the cross-sectional area of the rope 11-14,18,19,21,22 can be efficiently utilized for load bearing function while keeping the thickness of the rope small. In particular, the thickness of the coating 30 positioned against the flat outer side face can thus be small in amount and thereby the amount of material of the coating 30 can in this way be easily be minimized, which is advantageous both for the sake of reducing unnecessary material use but importantly for reducing the total weight of the rope.

Advantageously, for the purpose of more efficient usage of the cross section of the rope 11,12,13,14 for load bearing function, it is preferable that each of said load bearing members 10,10' has four flat outer side faces. For this purpose, in the preferred embodiments as illustrated in FIGS. 1*a* to 1*d* each of said load bearing members 10,10' the rope 11,12,13,14 is further rectangular in cross section. Each of the load bearing members 10,10' thus comprises flat outer side faces extending in thickness direction of the belt-shaped rope 11-14. In particular, the outer side faces of adjacent load bearing members 10,10' facing against each other are flat and parallel. The gaps between the adjacent load bearing members 10, 10' can in this way be formed narrow for the whole length of the gap as measured in thickness direction of the rope. Thus, the load bearing parts can be positioned close to each other with gap between them, which gap is narrow for the whole length of the gap as measured in thickness direction of the rope, but also the thickness of the coating 30 located between the surface of the rope 11,12, 13,14 and the load bearing member 10, 10' can be easily made thin for the whole width of the load bearing member 10, 10'. The corners of the load bearing members 10, 10' are preferably rounded as illustrated, as sharp edges placed against the coating 30 could damage the coating 30. It is preferable that each of said load bearing members 10,10' is at least substantially quadratic in cross section as in this way the strings 1,1' can easily be shaped at least substantially similar cross section with each other. Thus, they need not be shaped to have a very sharp wedge shape, which would be harmful for endurance of the sharp edge of the string in question.

In the preferred embodiments as illustrated in FIGS. 1*b*,1*d*,1*e* to 1*l*, the rope 12,14,15-22 comprises a contoured side surface provided with grooves 32,34,36,37,38,41,42, 44,46,48 oriented in the longitudinal direction of the rope 12,14,15-22. The coating 30 forms the outer surface of the grooves 32,34,36,37,38,41,42,44,46,48 as well as the outer surface of the rest of the rope 12,14,15-22. The grooves 32,34,36,37,38,41,42,44,46,48 of the surface of the rope 12,14,15-22 can be used to provide one or more of several technical advantages. The grooves can be used for making the engagement of the rope with a drive wheel firmer. In addition or alternatively they can be utilized for making the rope easier to flex away from flat form to a slightly curved form, especially when the grooves are positioned in width direction of the rope centrally between adjacent load bearing members. In addition or alternatively they can be utilized for, reducing the total weight of the coating 30.

The ropes 12,14,16,17,20-22 as illustrated in FIGS. 1*b*,1*d*, 1*f*,1*g*,1*j*,1*k* or 1*l* have deep grooves and are thereby particularly suitable to be used in an elevator arrangement, such that the contoured side of the rope is fitted to pass against a contoured circumference of a drive wheel 51 forming a counterpart for said contoured side of the rope 12,14,16,17, 20,22, said circumference being provided with ribs, a rib extending into each of said grooves 32,34,36,37,38,44,46,48 of the rope 12,14,16,17, 20-22. This kind of matching contoured shapes are advantageous especially for making the engagement firm and less likely to slip neither in longitudinal direction nor in transverse direction of the rope.

The ropes 15,16 17-20 as illustrated in FIGS. 1*e*, 1*f* and 1*g*-1*j* comprises two contoured side surfaces provided with grooves 36,38,38,40,41,42,43,44 positioned in width direction of the rope 15,16,17-20 centrally between adjacent load bearing members 10'',10'',10''',10'''',10'''''. Thus, the total weight of the coating 30 is reduced. Also, the rope 15,16, 17-20 is hereby made easier to flex away from flat form to a slightly curved form. Thus it can be made to adjust easily against a cambered roller of the elevator system, which may then be used for guiding the rope 15,16,17-20.

It is not necessary, however that the rope has a grooved surface. The wide sides of the belt-like rope can be for instance smooth as illustrated in FIGS. 1*a* and 1*c*. When the rope 11,13 as illustrated in FIGS. 1*a* and 1*c* is used in an elevator arrangement, then also the surface of the drive wheel 51 is preferably smooth. In that case, each of said rope 11,13 has a wide and smooth side without guide ribs or guide grooves or teeth, which may be in use fitted to pass against a smooth circumference of the drive wheel, which circumference is possibly but not necessarily slightly cambered.

The preferred details of the preferred embodiments of the rope are explained more specifically in the following. In the preferred embodiments illustrated in FIG. 1*b*, 1*d*,1*f*,1*g*,1*j*, 1*k*,1*l*, the rope 12,14,16,17,20,21,22 comprises bars 31,33, 35,39,45,47,49 oriented in the longitudinal direction of the rope 12,14,16,17,20,21,22 and grooves 32,34,36,37,38,44, 46,48 oriented in the longitudinal direction of the rope formed between the bars 31,33,35,39,45,47,49. In embodiments of FIGS. 1*b* and 1*e* to 1*l* the grooves 32,34,36,37,38, 41,42,44,46,48 include grooves 32,36,37,38,41,42,44,46,48 positioned in width direction of the rope 12,16,17,20,21,22 centrally between adjacent load bearing members 10,10'', 10''',10'''',10''''',10'''''' and the bars 31,33,35,39,45,47,49 include bars 31,35,45,47,49 positioned in width direction of the rope 12,16,17,20,21,22 centrally at the point of a load bearing member 10,10''',10'''',10''''',10''''''. Thus, the coating is at its thickest at the point of the load bearing member 10,10''',10'''',10''''',10'''''', and thinnest at the point of the gap between adjacent load bearing members 10,10''',10'''',10''''', 10''''''. Thereby, the load bearing members 10,10''',10'''', 10''''',10'''''' can be well protected with minimal thickness of coating 30. In the preferred embodiment illustrated in FIG. 1*g* the rope 17 comprises a contoured side surface provided with grooves 37,38 oriented in the longitudinal direction of the rope 17, including grooves 37 of a first depth positioned in width direction of the rope 17 centrally between adjacent load bearing members 10'' and grooves 38 of a second depth positioned in width direction of the rope 17 centrally at the point of a load bearing member 10'', the second depth being smaller than the first depth. Between each pair of successively adjacent (in width direction of the rope) grooves 37 and 38 there is a bar 39. Said bars 39 extend mutually same distance from the width directional central plane of the rope 17.

In the embodiments as illustrated in FIGS. 1*k* and 1*l* the load bearing members have a cross-sectional shape with an acute angle between adjacent flat outer side faces. In this case, it is especially beneficial that the rope 21,22 comprises a contoured side surface provided with grooves 46,48 oriented in the longitudinal direction of the rope, which grooves are positioned in width direction of the rope centrally between adjacent load bearing members 10''''',10''''''. Particularly preferably, the rope 21,22 comprises such grooves 46,48 which extend between the adjacent load bearing members 10''''',10'''''' With this structure a grooved rope surface is obtained with minimal use of coating material.

Figure 4:
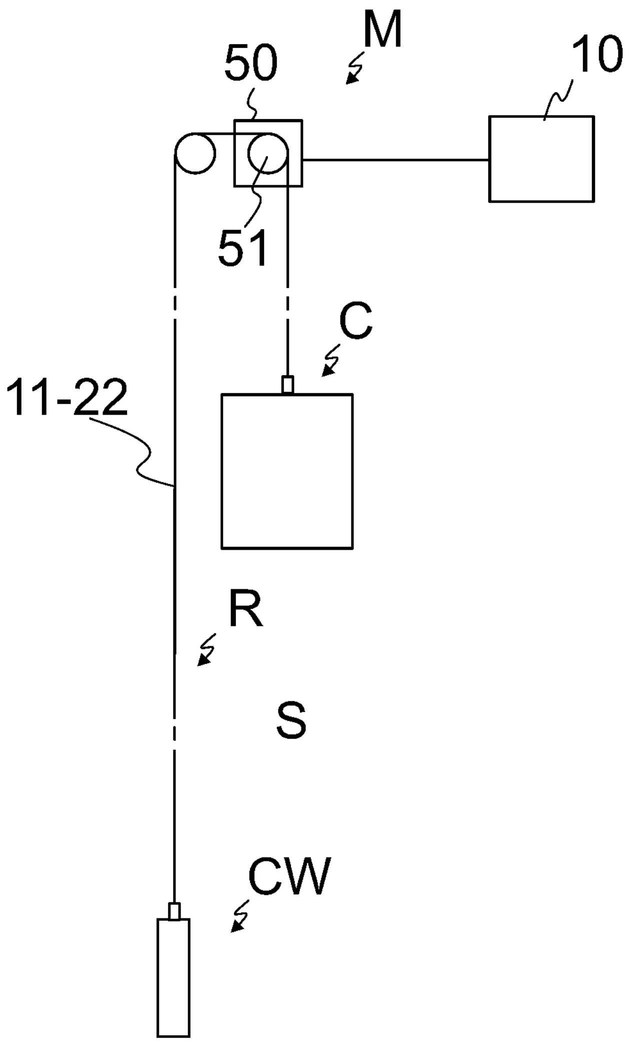
FIG. 4 illustrates preferred embodiment of an elevator.

FIG. 4 illustrates an elevator according to a preferred embodiment. The elevator comprises a hoistway S, an elevator car C and a counterweight CW vertically movable in the hoistway S, the car C and counterweight CW being interconnected with rope(s) 11-22 of a roping R, which ropes 11-22 are described and illustrated elsewhere in the application. The elevator further comprises a drive machine M which drives the elevator car C under control of an elevator control system 10. The drive machine M comprises a motor 50 and a drive wheel 51. The drive wheel 51 engages an elevator roping R, which passes around the drive wheel 51 and suspends the elevator car C and the counterweight CW. Thus, driving force can be transmitted from the motor 30 to the car C and counterweight CW via the drive wheel 51 and the roping R so as to move the car C and counterweight CW.

As mentioned, the rope 11-22 is belt-shaped, particularly having two wide sides opposite each other. The width/thickness ratio of each rope 11-22 is preferably at least 2, more preferably at least 4. In this way a large cross-sectional area for the rope is achieved, the bending capacity around the width-directional axis being good also with rigid materials of the load bearing members. In the preferred embodiments, the load bearing members 10,10',10",10'",10"",10'"", 10""' comprised in the rope together cover majority, preferably 70% or over, more preferably 75% or over, most preferably 80% or over, most preferably 85% or over, of the width of the cross-section of the rope 11-22. The width of the rope 11-22 is thus efficiently utilized. Thus the supporting capacity of the rope with respect to its total lateral dimensions is good, and the rope does not need to be formed to be thick.

The composite string 1,1',1",1'",1"",1'"",1""' is also referred to in the application as a load bearing composite string, wherein by composite it is meant a fiber reinforced composite material. The inner structure of the composite string 1,1',1",1'",1"",1'"",1""' is preferably more specifically as illustrated in FIG. 2 and described in the following. Individual fibers f of the composite string 1,1',1",1'",1"", 1'"",1""' are parallel with the longitudinal direction of the composite string 1,1',1",1'",1"",1'"",1""'. Thereby, the fibers f are aligned with the force when the of the composite string 1,1',1",1'",1"",1'"",1""' is under tension caused by pulling of the rope 11-22. Individual reinforcing fibers f are bound together with the polymer matrix m so that these together form a uniform composite string 1,1',1",1'",1"",1'"",1""'. Thus, each composite string 1,1',1",1'",1"",1'"",1""' is one solid elongated rodlike piece, the shape thereof, however, being helical due to the twisted structure of the load bearing member 10,10',10' of the rope 11-22 in which it is comprised. The reinforcing fibers f are preferably long continuous fibers extending the whole length of the composite string 1,1',1",1'",1"",1'"",1""'. Preferably as many fibers f as possible, most preferably essentially all the fibers f of the composite string 1,1',1",1'",1"",1'"",1""' are oriented in (i.e. parallel with) the longitudinal direction of the composite string 1,1',1",1'",1"",1'"",1""'. The reinforcing fibers f of the same composite string 1,1',1",1'",1"",1'"",1""' are in this case essentially untwisted in relation to each other. Thus the structure of the composite string 1,1',1",1'",1"",1'"",1""' can be made to continue the same as far as possible in terms of its cross-section, most preferably for the whole length of the composite string 1,1',1",1'",1"",1'"",1""'. The reinforcing fibers f are preferably distributed in the aforementioned composite string 1,1',1",1'",1"",1'"",1""' as evenly as possible, so that the composite string 1,1',1",1'",1"",1'"",1""' would be as homogeneous as possible in the transverse direction of the composite string 1,1',1",1'",1"",1'"",1""'. An advantage of the structure presented is that the matrix m surrounding the reinforcing fibers f keeps the interpositioning of the reinforcing fibers f essentially unchanged. It equalizes with its slight elasticity the distribution of a force exerted on the fibers, reduces fiber-fiber contacts and internal wear of the rope, thus improving the service life of the rope. The reinforcing fibers being carbon fibers, a good tensile rigidity and a light structure and good thermal properties, among other things, are achieved. They possess good strength properties and rigidity properties with small cross sectional area, thus facilitating space efficiency of a roping with certain strength or rigidity requirements. They also tolerate high temperatures, thus reducing risk of ignition. Good thermal conductivity also assists the onward transfer of heat due to friction, among other things, and thus reduces the accumulation of heat in the parts of the rope. The composite matrix m, into which the individual fibers f are distributed as evenly as possible, is most preferably of epoxy resin, which has good adhesiveness to the reinforcements and which is strong to behave advantageously with carbon fiber. Alternatively, e.g. polyester or vinyl ester can be used. Alternatively some other materials could be used, which is known to suit the reinforcing fiber f utilized. FIG. 2 presents a partial cross-section of the surface structure of the composite string 1,1',1",1'",1"",1'"",1""' as viewed in the longitudinal direction of the composite string 1,1',1",1'",1"",1'"", 1""', presented inside the circle in the figure, according to which cross-section the reinforcing fibers f of the composite string 1,1',1",1'",1"",1'"",1""' are preferably organized in the polymer matrix m.

FIG. 2 presents how the individual reinforcing fibers f are essentially evenly distributed in the polymer matrix m, which surrounds the fibers and which is fixed to the fibers f. The polymer matrix m fills the areas between individual reinforcing fibers f and binds essentially all the reinforcing fibers f that are inside the matrix m to each other as a uniform solid substance. Substantially all Individual fibers f of the composite string 1,1',1",1'",1"",1'"",1""' are thus embedded in the matrix m which is thereby common for them all. Thereby mutual abrasive movement between the reinforcing fibers f and mutual abrasive movement between the reinforcing fibers f and the matrix m are essentially prevented. A chemical bond exists between, preferably all, the individual reinforcing fibers f and the matrix m, one advantage of which is uniformity of the structure, among other things. To strengthen the chemical bond, there can be, but not necessarily, a coating (not presented) of the actual fibers between the reinforcing fibers and the polymer matrix m. The polymer matrix m is of the kind described elsewhere in this application and can thus comprise additives for fine-tuning the properties of the matrix as an addition to the base polymer. The polymer matrix m is preferably of a hard non-elastomer. The composite material comprising reinforcing fibers f being embedded in the polymer matrix means here that the individual reinforcing fibers f are bound to each other with a polymer matrix m e.g. in the manufacturing phase by immersing them together in the molten material of the polymer matrix. In this case the gaps of individual reinforcing fibers bound to each other with the polymer matrix comprise the polymer of the matrix. In this way a great number of reinforcing fibers bound to each other in the longitudinal direction of the rope are distributed in the polymer matrix. The reinforcing fibers are preferably distributed essentially evenly in the polymer matrix such that the composite string 1,1',1",1'",1"",1'"",1""' is as homogeneous as possible when viewed in the direction of the cross-section of the rope. In other words, the fiber density in the cross-section of the load bearing member does not therefore vary greatly. The reinforcing fibers f together with the matrix m form a uniform composite string 1,1',1",1'", 1"",1'"",1""', inside which abrasive relative movement does not occur when the rope is bent. The individual reinforcing fibers of the composite string 1,1',1",1'",1"",1'"",1""' are mainly surrounded with polymer matrix m, but fiber-fiber contacts can occur in places because controlling the position of the fibers in relation to each other in their simultaneous impregnation with polymer is difficult, and on the other hand, perfect elimination of random fiber-fiber contacts is not necessary from the viewpoint of the functioning of the invention. If, however, it is desired to reduce their random occurrence, the individual reinforcing fibers f can be precoated such that a polymer coating is around them already before the binding of individual reinforcing fibers to each other. In the invention the individual reinforcing fibers of the string 1,1',1",1'",1"",1'"",1""' can comprise material of the polymer matrix around them such that the polymer matrix m is immediately against the reinforcing fiber but alternatively a thin coating, e.g. a primer arranged on the surface of the reinforcing fiber in the manufacturing phase to improve chemical adhesion to the matrix m material, can be in between. Individual reinforcing fibers are distributed evenly in the composite string 1,1',1",1'",1"",1""',1"""" such that the gaps of individual reinforcing fibers f are filled with the polymer of the matrix m. Most preferably the majority, preferably essentially all of the gaps of the individual reinforcing fibers f in composite string 1,1',1",1'",1"",1""', 1"""" are filled with the polymer of the matrix m. The matrix m of the composite string 1,1',1",1'",1"",1""',1"""" is most preferably hard in its material properties. A hard matrix m helps to support the reinforcing fibers f, especially when the rope bends, preventing buckling of the reinforcing fibers f of the bent rope, because the hard material supports the fibers f. To reduce the buckling and to facilitate a small bending radius of the rope, among other things, it is therefore preferred that the polymer matrix m is hard, and therefore preferably something other than an elastomer (an example of an elastomer: rubber) or something else that behaves very elastically or gives way. The most preferred materials are epoxy resin, polyester, phenolic plastic or vinyl ester. The polymer matrix m is preferably so hard that its module of elasticity (E) is over 2 GPa, most preferably over 2.5 GPa. In this case the module of elasticity (E) is preferably in the range 2.5-10 GPa, most preferably in the range 2.5-3.5 GPa. Preferably over 50% of the surface area of the cross-section of the composite string 1,1',1",1'",1"",1""',1"""" is of the aforementioned reinforcing fiber, preferably such that 50%-80% is of the aforementioned reinforcing fiber, more preferably such that 55%-70% is of the aforementioned reinforcing fiber, and essentially all the remaining surface area is of polymer matrix m. Most preferably such that approx. 60% of the surface area is of reinforcing fiber and approx. 40% is of matrix m material (preferably epoxy). In this way a good longitudinal strength of the rope is achieved.

In this application, the term load bearing member or load bearing string refers to a structural part (of the rope 11,12, 13,14,15,16,17,18,19,20,21,22 in question), which structural part is elongated and continues throughout all the length of the rope 11-22 in question. The load bearing ability provides that the structural part in question can alone or together with several essentially similar structural parts bear without breaking a significant part of the tensile load exerted on the rope in question in the longitudinal direction of the rope. The tensile load can be transmitted inside the load bearing member/string all the way from its one end to the other, and thereby in the preferred elevator transmit tension from the elevator car C to the counterweight CW.

In the following, several possible and preferred methods for manufacturing of a load bearing member 10,10',10",10'", 10"",10""',10"""" are described without limiting the protection to any specific method. In one preferable method the strings 1,1',1",1'",1"",1""',1"""" are directed around a central string 1,1',1",1'",1"",1""',1"""" such that abreast they form a dense outer layer of strings 1,1',1",1'",1"",1""',1"""". The strings 1,1',1",1'",1"",1""',1"""" can be fashioned into their final shape in advance. Alternatively, the strings 1,1',1",1'", 1"",1""',1"""" are shaped by means of compression into their final shape when they are joined as a part of the load bearing member 10,10',10",10'",10"",10""',10"""" being manufactured. This is implemented by compressing pre-manufactured strings 1,1',1",1'",1"",1""',1"""" together through a nozzle for instance. A heating is directed to the strings 1,1',1",1'",1"",1""',1"""" in conjuction with the compressing so that the premanufactured strings 1,1',1",1'",1"",1""',1"""" harden into the shape resulting from the compression. In this case, the matrix material of the premanufactured string 1,1',1",1'",1"",1""',1"""" is thermosetting. Preferably a thin polymer coating is arranged in advance around at least a part of the material of the pre-manufactured strings 1,1',1",1'", 1"",1""',1"""", which coating still essentially retains its surface properties in the temperature where the material of the pre-manufactured string 1,1',1",1'",1"",1""',1"""" inside it can be formed into its final permanent shape with compression. Preferably, the coating has a melting point substantially lower than the heatsetting temperature of the composite material. The materials of the pre-manufactured strings 1,1',1",1'",1"",1""',1"""" thus coated do not stick to each other at any point of process, which would happen if the coating was softened too much in the treating temperature of the composite inside it. The coating is implemented preferably by wrapping or braiding a polymer film around the material of the pre-manufactured strings 1,1',1",1'",1"",1""',1"""", which covers their surface. The coating can be implemented also by spraying or by immersing the material of the strings 1,1',1",1'",1"",1""',1"""" in a polymer tank. The coating can then be in the form of a lacquer, which is hardenable e.g. by UV radiation. Then the coating forms a good base for receiving the coating 30 against it, for instance. Preferably the load bearing member 10,10',10",10'",10"",10""',10"""" is manufactured as a continuous process such that a number of pre-manufactured strings 1,1',1",1'",1"",1""',1"""", possibly coated e.g. with a film, are fed from the reel simultaneously through a constricting nozzle, which forces the pre-manufactured strings 1,1',1",1'",1"",1""',1"""" into the proximity of each other and produces the aforementioned compression on the load bearing member 10,10',10",10'",10"",10""',10"""" in the radial direction thereof. The nozzle may have a rectangular or round shape depending on what kind of shape the load bearing member 10,10',10",10'",10"",10""',10"""" is to have. Also alternative methods exist. The load bearing members 10,10',10",10'",10"",10""',10"""" can each be formed with any of the methods described and illustrated for a rope in WO2008129116 A1. Respectively, the load bearing members 10,10',10",10'",10"",10""',10"""" can each have any of the structures described and illustrated for a rope in WO2008129116 A1. In the manufacture of the rope 11-22 several load bearing members 10,10',10",10'",10"",10""', 10"""" obtained for example in one of the above described manners are embedded in a coating common for them all.

Figure 3B:
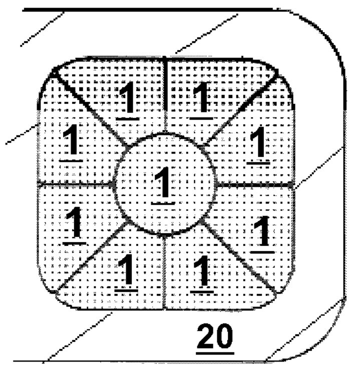

FIGS. 1*a*-1*l* and 3 each illustrate load bearing members 10,10',10",10'",10"",10""',10"""" with multiple load bearing strings 1,1',1",1'",1"",1""',1"""". All of the load bearing strings 1,1',1",1'",1"",1""',1"""" are not marked by reference number, but parts drawn with dotted fill represent the load bearing strings 1,1',1",1'",1"",1""',1"""" as it is also apparent based on FIG. 3*b* illustrating details of FIG. 3*a*.

In each embodiment, the load bearing members 10,10', 10",10'",10"",10""',10"""" are all similar. This is preferred so as to make the rope structure and behavior more uniform. However, this is not necessary as the rope could alternatively have load bearing members which have different structures, e.g. by combining load bearing members 10,10',10",10'", 10"",10""',10"""" disclosed in this application.

It is to be understood that the above description and the accompanying Figures are only intended to illustrate the present invention. It will be apparent to a person skilled in the art that the inventive concept can be implemented in various ways. The invention and its embodiments are not limited to the examples described above but may vary within the scope of the claims.

The invention claimed is:

1. A rope for a hoisting device, which rope has at least one flat outer surface and comprises several parallel load bearing members spaced apart in a width direction of the rope so as to not be in contact with adjacent load bearing members and embedded in a common coating, each of the load bearing members comprising several load bearing strings twisted together, wherein one or more of said load bearing members has at least a substantially polygonal cross-sectional shape, wherein each of the load bearing strings is made of composite material comprising reinforcing fibers embedded in a polymer matrix, the reinforcing fibers of each of the load bearing strings extending parallel to a longitudinal direction of the load bearing string such that the reinforcing fibers of each load bearing string are untwisted in relation to each other in the load bearing string, wherein one or more of said load bearing members has at least one substantially flat outer side face extending in the width direction of the rope, and wherein a number of load bearing strings defining an outside of each load bearing member is greater than a number of sides of the substantially polygonal cross-sectional shape.

2. The rope according to claim 1, wherein one or more of said load bearing members has at least a substantially rectangular, triangular, pentagonal or hexagonal cross-sectional shape.

3. The rope according to claim 1, wherein one or more of said load bearing members has at least a substantially quadratic cross-sectional shape.

4. The rope according to claim 1, wherein the rope has a contoured side surface provided with grooves oriented in a longitudinal direction of the rope, including grooves positioned in the width direction of the rope centrally between adjacent load bearing members.

5. The rope according to claim 1, wherein the rope has a contoured side surface provided with grooves oriented in a longitudinal direction of the rope, including grooves of a first depth positioned in the width direction of the rope centrally between adjacent load bearing members and grooves of a second depth positioned in the width direction of the rope at the point of a load bearing member, the second depth being smaller than the first depth.

6. The rope according to claim 1, wherein said load bearing strings include load bearing strings twisted around a center string.

7. The rope according to claim 1, wherein a center string of said load bearing strings is parallel with a longitudinal direction of the load bearing member.

8. The rope according to claim 1, wherein said reinforcing fibers are carbon fibers.

9. The rope according to claim 1, wherein said coating is made of elastomeric material.

10. An elevator comprising a vertically movable elevator car and a roping suspending the car, the roping comprising at least one rope as defined in claim 1.

11. The rope according to claim 1, wherein a first layer of said load bearing strings surrounds a center string of said load bearing strings, the first layer leaning against the center string.

12. A rope for a hoisting device, which rope has at least one flat outer surface and comprises several parallel load bearing members spaced apart in a width direction of the rope so as to not be in contact with adjacent load bearing members and embedded in a common coating, each of the load bearing members comprising several load bearing strings twisted together, wherein one or more of said load bearing members has at least a substantially polygonal cross-sectional shape, wherein each of the load bearing strings is made of composite material comprising reinforcing fibers embedded in a polymer matrix, the reinforcing fibers of each of the load bearing strings extending parallel to a longitudinal direction of the load bearing string such that the reinforcing fibers of each load bearing string are untwisted in relation to each other in the load bearing string, wherein one or more of said load bearing members has at least one substantially flat outer side face covered by said coating with at least a substantially constant material thickness, and wherein a number of load bearing strings defining an outside of each load bearing member is greater than a number of sides of the substantially polygonal cross-sectional shape.

13. The rope according to claim 12, wherein one or more of said load bearing members has at least one at least substantially flat outer side face extending in the width direction of the rope.

14. The rope according to claim 12, wherein one or more of said load bearing members has at least substantially rectangular, triangular, pentagonal or hexagonal cross-sectional shape.

15. The rope according to claim 12, wherein one or more of said load bearing members has at least a substantially quadratic cross-sectional shape.

16. A rope for a hoisting device, which rope has at least one flat outer surface and comprises several parallel load bearing members spaced apart in a width direction of the rope so as to not be in contact with adjacent load bearing members and embedded in a common coating, each of the load bearing members comprising several load bearing strings twisted together, wherein one or more of said load bearing members has at least a substantially polygonal cross-sectional shape, wherein each of the load bearing strings is made of composite material comprising reinforcing fibers embedded in a polymer matrix, the reinforcing fibers of each of the load bearing strings extending parallel to a longitudinal direction of the load bearing such that the reinforcing fibers of each load bearing string are untwisted in relation to each other in the load bearing string, wherein a first layer of said load bearing strings surrounds a center string of said load bearings strings, the first layer leaning against the center string, each load bearing string of said first layer having a cross section tapering towards the center string, and wherein a number of load bearing strings defining an outside of each load bearing member is greater than a number of sides of the substantially polygonal cross-sectional shape.

17. The rope according to claim 16, wherein the load bearing strings of said first layer are in helical formation around the center string.

* * * * *